Figure 1:
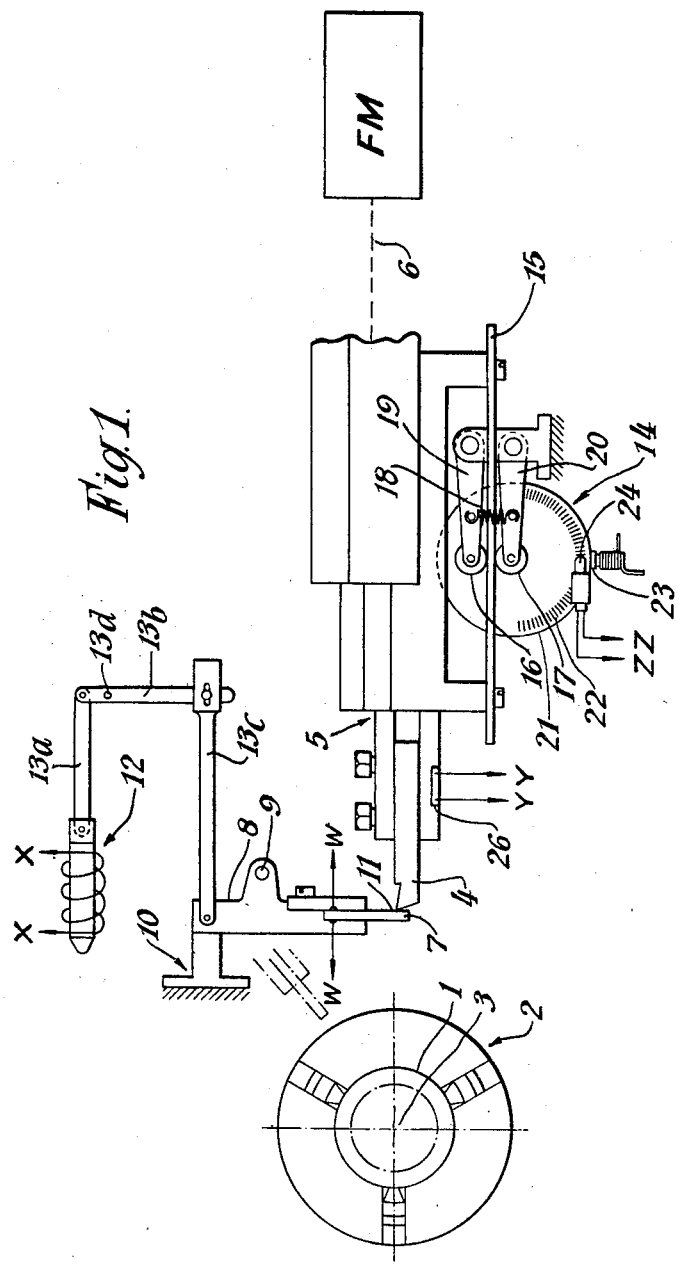

United States Patent Office 3,143,041
Patented Aug. 4, 1964

3,143,041
CONTROL FOR MACHINE TOOL UTILIZING A
VIBRATING CRYSTAL
Laszlo Namenyi-Katz, Roehampton, England, assignor to Vectron Electro-Physics Limited, Bedfont, England, a British company
Filed Jan. 22, 1962, Ser. No. 167,859
Claims priority, application Great Britain Jan. 27, 1961
10 Claims. (Cl. 90—16)

The present invention relates generally to the control of machine tools. More particularly, the present invention relates to the control of machine tools which, in operation, are moved towards a workpiece in a predetermined direction to perform a work operation thereon, such as a turning, grinding, milling or drilling operation for example.

It is an object of this invention to control the distance moved by a tool in said predetermined direction and hence the extent of the work operation performed on said workpiece by a tool in a manner which compensates for wear of the cutting edge or face of the tool.

It is a further and important object of the invention to provide an extremely accurate means for controlling feed of the tool, which will be self-clearing of fine particles of foreign matter such as chips, swarf or dirt: this is achieved by virtue of vibration of an element as will be seen. The accuracy of the device is in the main due to the fact that it operates by damping or suppressing a vibration of very small amplitude, this action being instantaneous and being operative within a limit of accuracy within a half-wave of such vibration which is in itself of micrometric dimension.

In a machine in which a tool approaches towards a workpiece in a predetermined direction and performs a work operation thereon such as a turning, grinding, milling or drilling operation thereon, for example, the present invention provides a system for controlling the distance travelled by a tool in said direction and hence the extent of the work operation performed on said workpiece by a tool, said system comprising a feed mechanism for moving a tool in said predetermined direction, a counting device coupled with the movement of a tool in said predetermined direction in such a manner that the rate of counting is directly proportional to the speed of said movement, said counting device also being coupled with said feed mechanism, a sensing device normally positioned in the approach path of a tool in said predetermined direction and having a surface contacted (in said normal position) by a leading edge of a tool during its approach towards a workpiece, said surface being (in the normal position thereof) a known distance from a point in said predetermined direction fixed relative to a workpiece, said sensing device being coupled with said counting device and serving, upon being contacted by a leading edge of a tool, to cause the counting device to start counting, and said feed mechanism being responsive to said counting device after a predetermined count thereof to stop the movement of a tool in said predetermined direction.

Said system according to the invention may also include a further sensing device which gives an output signal when a tool contacts a workpiece, said further sensing device being coupled with said feed mechanism which is responsive to said output signal to change the speed of movement of a tool in said predetermined direction.

One method of carrying out the system of the present invention will now be described in relation to a turning or cutting operation to be performed on a lathe, but it should be understood that the following description is given by way of example only and is intended in no way to limit the scope of the invention as defined by the appended claims.

Figure 2:
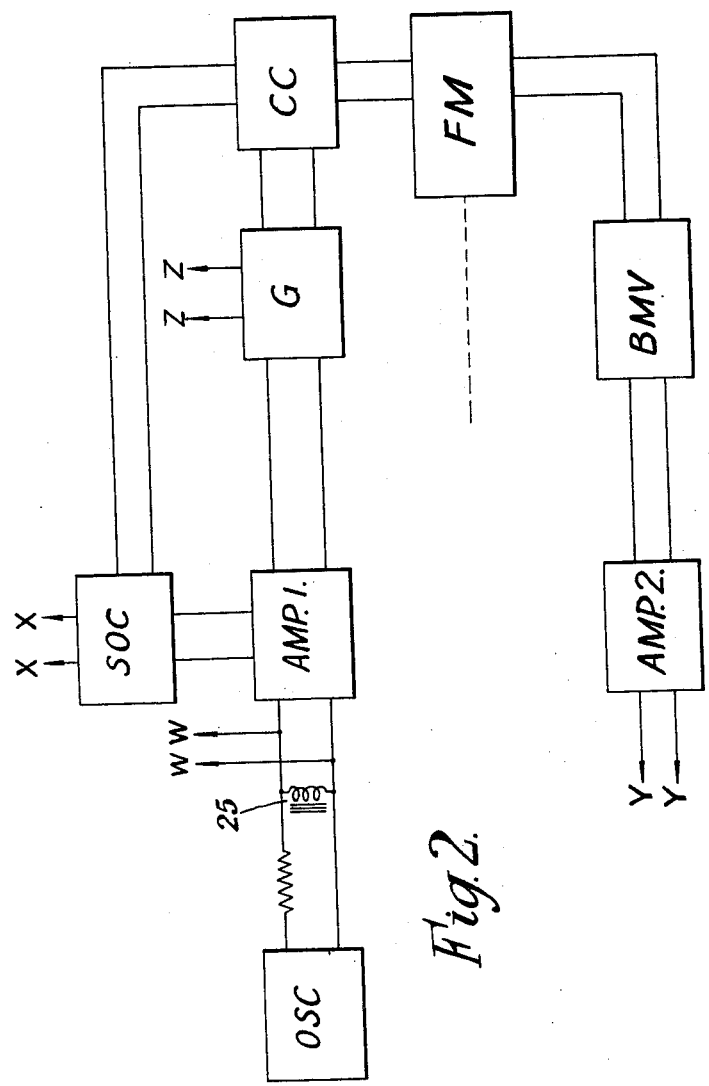

Reference is made to the accompanying drawings, in which:
FIGURE 1 is a diagrammatic representation of a system according to the present invention for use with a lathe;
FIGURE 2 is a block circuit diagram of electrical apparatus forming part of the system of FIGURE 1;
FIGURE 3 is a reproduction of an oscilloscope trace of a signal fed into part of the circuit of FIGURE 2.

Referring to FIGURE 1 of the accompanying drawings, 1 represents a workpiece mounted in a holder 2 of a lathe for rotation about an axis 3. 4 is a cutting tool mounted in a holder and slide assembly indicated generally at 5 and movable in a predetermined direction perpendicular to the axis 3 and passing therethrough to approach the workpiece 1 and perform a turning operation thereon. The tool 4 and its holder and slide 5 are movable in said predetermined direction by means of a feed mechanism FM, mechanical connection between the feed mechanism and the slide 5 being indicated by the broken line 6.

Normally positioned in the path of the tool 4 as it is moved in said predetermined direction towards the workpiece 1 is a piezoelectric crystal 7. The crystal 7 is mounted in a holder 8 pivotable about a shaft 9. As will be seen, the point of pivoting the holder 8 about the shaft 9 is such that the weight of the holder will tend to rotate it in a counter clockwise (FIGURE 1) direction and bring the upper end of the holder against a relatively fixed stop member 10. The crystal 7 has a surface 11 which is contacted by the leading edge of the tool 4 as it approaches the workpiece and, in the normal position of said crystal the surface 11 is a known distance from a point in said predetermined direction fixed relative to the workpiece. Said point will be referred to herein for the sake of convenience as a "datum point" and in this embodiment of the invention the datum point is conveniently at the intersection of the axis of rotation 3 and said predetermined direction.

12 indicates an electro-magnetic solenoid coupled by a linkage mechanism comprising pivotally connected links 13a, 13b and 13c, the link 13b being pivoted at 13d, to the upper end of the holder 8. When the solenoid 12 is energized, as will be described later, the holder 8 is pivoted about the shaft 9 in a clockwise direction to the position shown in broken outline in FIGURE 1 to remove the crystal from the path of the tool 4.

14 indicates generally the mechanical part of a counting device so coupled with the slide 5, and thereby with the feed mechanism FM, that it is capable of measuring the speed of movement of the tool 4 in said predetermined direction. More specifically, the mechanical part of the counting device consists of an accurately ground metal strip 15 fixed to the tool slide 5 and against which the precision ground rollers 16 and 17 are held clamped by means of a spring 18 urging together arcuately pivotable arms 19 and 20. One of the rollers 17 is fixed for rotation with a disc 21 having a plurality of evenly spaced-apart light transmitting apertures arranged in a circle coaxial with the axis of rotation of the disc. Conveniently, said disc 21 is formed of glass or other transparent material and said apertures are defined between a plurality of evenly spaced strips 22 impermeable to light. To the rear (FIGURE 1) side of the disc 21 is positioned a light source 23 separated from the corresponding side of the disc by a mask (not shown) having a narrow slit therein (of the order of .0025" wide) and upon which light from the light source 23 is focussed by means of a lens arrangement (not shown). To the side of the disc 21 remote from the light source 23 and aligned therewith is a photosensitive device 24 which, conveniently, consists of a photo-sensitive transistor. Thus, as tool 4 is moved in said predetermined direction the disc is rotated and "pulses" of light are received by the photo-sensitive device 24 through the light transmitting apertures from the light source 23.

Referring now more particularly to FIGURE 2 of the drawings, OSC represents an oscillator circuit for existing vibration of the crystal 7 preferably at a resonance frequency thereof. The capacitance of the crystal 7 is neutralized by an inductance 25 so that when the vibrations of the crystal 7 are damped by a tool contacting the surface 11 thereof a large change will take place in the characteristics of the crystal. The crystal 7 is also connected to an amplifier circuit AMP 1 which incorporates a limiting and differentiating network so as to produce a significant output pulse upon said change in the characteristics of the crystal. The output from the amplifier circuit AMP 1 is fed to a gate G coupled to a counting circuit CC. The gate G is also connected to the photo-sensitive device 24. When the leading edge of a tool contacts the surface 11, which is vibrating in a certain very small but finite amplitude, an output signal from the amplifier AMP 1 opens the gate G and allows the pulses from the photo-sensitive device 24 to be fed to the counting circuit CC thereby initiating a count therein. As will be seen, the amplifier AMP 1 is also connected to a solenoid operating circuit SOC. This solenoid operating circuit serves, upon the tool 4 contacting the surfaces 11, to energize the solenoid 12 and pivot the crystal 7 into the broken line position shown in FIGURE 1, and therefore out of mechanical contact with the tool 4.

As shown in FIGURE 2 the counting circuit is coupled to the feed mechanism FM so that after a predetermined count, which is a measure of the tool movement in the operative direction, a signal will be fed to the feed mechanism FM to stop the movement of the tool 4 in said predetermined direction. It may also be arranged, if desired, that the counting circuit can signal the feed mechanism to retract the tool after the required work operation has been carried out. To those skilled in the art no instruction is necessary as the stopping and if required retardation by the counting mechanism and associated circuit 6 connected to the feed mechanism FM. These functions are well known per se and form no part of the invention.

It is often required that the approach speed of the tool 4 towards the workpiece is different to the approach speed of the tool when cutting or turning the workpiece. For achieving this, there may be provided a further sensing device in the form of a piezoelectric crystal 26 mounted on the tool and holder 5 and connected to an amplifier AMP 2, FIGURE 2. The amplifier AMP 2 is coupled in turn to a bistable multivibrator BMV which is coupled to the feed mechanism FM. FIGURE 3 shows the form of output signal from the mechanically vibrated crystal 26 when the leading edge of the tool 4 first contacts the workpiece 1 whereby such vibration is excited. The amplifier AMP 2 serves to detect the surges in the output from the crystal 26 due to the cutting or analogous operation and feed a signal to the bistable multivibrator to change the state thereof and this in turn feeds an output signal to the feed mechanism FM signalling a change of feed speed of the tool 4 in said predetermined operative direction. That is, one state of the multivibrator corresponds to one speed of the feed mechanism and the other state of the multivibrator to another speed thereof. The change of feed speed will usually result in a slower approach of the tool since it is usually required to approach or feed the tool 4 towards the workpiece at a faster speed than required when the tool is cutting the workpiece.

The system of the present invention is capable of operating to within .001" accuracy. To achieve this, the diameter of the wheel 17 is conveniently 1/π" so that it completes one full revolution for every 1" movement of the tool 4. To obtain .001" accuracy the disc has 1000 apertures spaced-apart so that the disc 21 will transmit a light impulse to the photo-sensitive device every .001" of feed movement of the tool.

The crystal 7 has its surface 11 at a pre-set distance, say 2", from the axis of the say 1" diameter workpiece. The approach speed of the tool 4 is, say 5"/sec. or .005"/m. sec. The amplitude of the vibration of crystal 7 is, say .0001". The datum point is distanced to within the .0001" of the peak of amplitude. At .005"/m. sec. feed speed, the vibration frequency must be greater than or equal to 50 kc./s. and therefore, a pulse will be derived within .0001" movement of the cutting edge of the tool in contact with the surface 11. If the workpiece is to be machined to half its diameter, that is ¼" from the datum point, the counting circuit must be set to stop the feed mechanism after a travel of the tool of 1¾", from the point at which it contacts the surface 11.

What is claimed is:

1. In a machine having a tool, which approaches towards a workpiece in a predetermined direction and performs a work operation thereon such as for example a turning, grinding, milling or drilling operation, and means for driving said tool, the improvements comprising an electrically excited vibratory element removably positioned in the path of approach of said tool for contact with said tool to damp and restrain vibration of said element, means operated by the damped vibration of said element to produce an electrical signal, means responsive to said electrical signal for removing said element from the path of said tool, means for measuring the approach of said tool to said workpiece and operation of which is initiated by said signal, and means for stopping the movement of said tool toward said workpiece operated by said measuring means when a predetermined measurement is achieved.

2. In a machine the improvements according to claim 1 in which said vibratory element comprises a piezoelectric crystal.

3. In a machine the improvements according to claim 1 in which said vibratory element comprises a piezoelectric crystal and said tool is mounted in rigid mechanical association with a second piezoelectric crystal whereby said tool and said second crystal vibrate together, and means for electrically signalling vibration of said second crystal due to the work operation of said tool to control the speed of approach of said tool to the workpiece.

4. In a machine the improvements according to claim 1 in which said measuring means comprises an optical shutter connected to said tool so as to move in accordance with the feed speed of said tool, a source of light and a photosensitive element coacting with said shutter, and electrical signaling means actuated by the output of said photosensitive element to indicate the feed progress of said tool.

5. In a machine in which a tool is mounted for linear feed towards a datum within a workpiece, electrically controlled power driven feed means, a piezoelectric crystal movably supported for electrically excited vibration in a plane including the line of feed of said tool, movable supporting means for said crystal, electrically energized means for moving said crystal into or out of the feed path of said tool, means for electrically energizing said moving means to move said crystal out of the feed path, said energizing means being operated by a reduction of vibration of said crystal due to contact of the crystal with said tool, counting means responsive to feed movement of the tool to signal progress thereof, and means actuated also by the contact of said tool and crystal to initiate operation of said counting means.

6. In a machine the combination according to claim 5 further comprising a second piezoelectric crystal mounted to vibrate with said tool and electric means to control the operative speed of said feed means actuated by vibration of said second crystal.

7. Machine according to claim 5 in which said electrically energized means comprises a pivoted arm movable by a solenoid in one sense of direction and returnable by gravity in the alternative sense.

8. Machine according to claim 5 in which said counting means comprises a rotary optical shutter, a source of light and a photosensitive element coacting therewith, and frictional means connecting said shutter to said tool for rotating the shutter in accordance with feed movement of said tool.

9. Machine according to claim 5 in which said counting means includes a shutter in the form of a rotatable disc having a plurality of evenly spaced-apart light transmitting apertures arranged in a circle coaxial with the axis of rotation of the disc, a drive wheel fixed for rotation with the disc and engaging means mounted on a holder for the tool which means causes rotation of said drive wheel in accordance with the feed of the tool, a light source for transmitting light through said apertures, a photo-sensitive device, and a counting circuit for counting pulses of light received by said photosensitive device as said disc is rotated, whereby a count of said pulses is a measure of the distance travelled by the tool toward said datum after initiation of the count.

10. Machine according to claim 5 in which said counting means includes a shutter in the form of a rotatable disc having a plurality of evenly spaced-apart light transmitting apertures arranged in a circle coaxial with the axis of rotation of the disc, a drive wheel fixed for rotation with the disc and engaging means mounted on a holder for the tool which means causes rotation of said drive wheel in accordance with the feed of the tool, a light source for transmitting light through said apertures, a photosensitive device, a counting circuit for counting pulses of light received by said photosensitive device as said disc is rotated, whereby a count of said pulses is a measure of the distance travelled by the tool toward said datum after initiation of the count, and a gate circuit normally inhibiting signals from said photosensitive device to said counting circuit, said gate circuit being opened to permit said signals to be fed in said counting circuit upon actuation of said means to initiate operation of said counting means by contact of said tool and crystal.

References Cited in the file of this patent

UNITED STATES PATENTS

| 1,891,777 | Plummer | Dec. 20, 1932 |
| 2,340,843 | Bailey | Feb. 1, 1944 |
| 2,853,900 | Hillyer | Sept. 30, 1958 |
| 2,862,200 | Shepard et al. | Nov. 25, 1958 |
| 2,894,186 | Cail et al. | July 7, 1959 |
| 2,979,972 | Danly | Apr. 18, 1961 |

FOREIGN PATENTS

| 860,256 | Great Britain | Feb. 1, 1961 |
| 862,972 | Great Britain | Mar. 15, 1961 |